US012203617B2

United States Patent
Passgang et al.

(10) Patent No.: US 12,203,617 B2
(45) Date of Patent: Jan. 21, 2025

(54) METHOD OF JOINING A PIN TO A CAVITY AND JOINT ASSEMBLY

(71) Applicant: Hella GmbH & Co. KGaA, Lippstadt (DE)

(72) Inventors: Frank Passgang, Lippstadt (DE); Thomas Albert Röbbecke, Erwitte (DE); Sonja Seibt, Warburg (DE); Ulrich Temme, Lippstadt (DE); Jürgen Wessling, Geseke (DE); Christian Wieck, Lippstadt (DE); Martin Wüller, Warendorf (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/804,962

(22) Filed: Jun. 1, 2022

(65) Prior Publication Data
US 2022/0290829 A1    Sep. 15, 2022

Related U.S. Application Data

(63) Continuation of application No. PCT/EP2019/084586, filed on Dec. 11, 2019.

(51) Int. Cl.
*F21S 41/19*   (2018.01)
*B29C 65/48*   (2006.01)
*F21V 19/00*   (2006.01)

(52) U.S. Cl.
CPC ............ *F21S 41/192* (2018.01); *B29C 65/48* (2013.01); *B29C 65/4845* (2013.01); *F21V 19/0005* (2013.01)

(58) Field of Classification Search
CPC .... F21S 41/192; B29C 65/48; B29C 65/4845; B29C 65/7826; B29C 66/126;
(Continued)

(56) References Cited

U.S. PATENT DOCUMENTS

| | | | | |
|---|---|---|---|---|
| 4,474,306 A | * | 10/1984 | Nakauchi | F16B 11/006 403/375 |
| 10,145,403 B2 | * | 12/2018 | Dannheisig | F16B 12/04 |
| 2004/0240083 A1 | | 12/2004 | Yamakawa | |

FOREIGN PATENT DOCUMENTS

| | | | | |
|---|---|---|---|---|
| DE | 4414901 C1 | * | 6/1995 | ............ B29C 65/48 |
| WO | 2011076634 A1 | | 6/2011 | |
| WO | 2017/180060 A1 | | 10/2017 | |

OTHER PUBLICATIONS

Permabond—"Permabond® UV625 US-Curable Adhesive Technical Data Sheet" Dated Jun. 8, 2018. (Year: 2018).*

* cited by examiner

*Primary Examiner* — Alex B Efta
*Assistant Examiner* — Alexander S Wright
(74) *Attorney, Agent, or Firm* — Husch Blackwell LLP

(57) ABSTRACT

A method is provided for joining a pin member of a first component to a second component with a cavity, using an adhesive, to fasten the pin in a target position extending at least partially into the cavity. A distance (D) is provided between the bottom surface of the cavity and the facing end of the pin. A flexible spacer is positioned on the bottom surface of the cavity. The thickness of the spacer equals or exceeds the distance (D) between the bottom surface of the cavity and the facing end of the pin in the target position. The adhesive is filled into the cavity onto the flexible spacer, and the pin is positioned in the target position. The adhesive is cured to obtain a joint between the pin and the second component.

6 Claims, 3 Drawing Sheets

(58) Field of Classification Search
CPC ........... F21V 19/005; B29L 2011/0016; B29L 2011/0083; B29L 2011/0075; B29L 2031/747; B29L 2031/3055; F16B 11/006; G02B 7/025
See application file for complete search history.

METHOD OF JOINING A PIN TO A CAVITY AND JOINT ASSEMBLY

CROSS REFERENCE TO RELATED APPLICATIONS

The present application claims priority to PCT Application No. PCT/EP2019/084586, filed Dec. 11, 2019, the entirety of which is hereby incorporated by reference.

FIELD OF THE INVENTION

The present invention relates to a method of joining a pin member of a first component to a second component with a cavity by means of an adhesive in order to fasten the pin in a target position extending at least partially into the cavity with a distance between the bottom surface of the cavity and the facing end of the pin. The invention further relates to a corresponding joint assembly.

BACKGROUND OF THE INVENTION

Precise adjustment of light sources and optical components, e.g. lenses, reflectors or optical waveguides, relative to each other is a key challenge in assembling lighting devices of motor vehicles. During mounting of the light source group and/or related optical components on a carrier of the lighting device, e.g. a platform or a holding frame, their relative positions are varied by a manipulator while the light source is operated and the resulting lighting effect is monitored. The target position of the components is then finally defined by the constitution of a desired target lighting effect. The fixation of the components in this target position is usually established by adhesive joints, especially between pin members of the first component and associated cavities of the carrier.

A major issue concerning such adhesive joints is the effect of volumetric shrinkage of the adhesive during curing, caused e.g. by the evaporation of a solvent or by a cross-linking reaction. This shrinkage effect yields a subsequent alteration of the adjusted position of the light source or optical component and therefore a potentially critical deterioration of the lighting effect generated by the lighting device.

In an exemplary process, a cavity of the carrier is filled with a flowable adhesive and the optical component is held and positioned by a manipulator so that a pin member of the optical component at least partially extends into the cavity and the adhesive. During the following fine adjustment of the optical component relative to an operating light source, the displacements of the pin remain confined to the cavity, e.g. the cavity exhibits a depth of 9 mm, the pin exhibits a length of >9 mm and the displacement range of the pin in a vertical direction, i.e. along its longitudinal axis, during the fine adjustment amounts to about 1 mm. The shrinkage of a conventional ultraviolet (UV)-light curable adhesive then typically yields an undesired subsidence of the pin during curing on the order of 100 μm in the vertical direction.

In the context of a lighting device for a motor vehicle, such shifts along the vertical axis are most disadvantageous, because they strongly affect the position of the light cut-off line projected onto the road, which represents a key performance criterion of the lighting device subject to strict regulations and customer specifications.

The document EP 1 690 906 B1 teaches a method for gluing two workpieces with an adhesive, wherein after adjustment of the workpieces connecting parts wetted with a fixing glue are placed against appropriate surfaces, so that the connecting parts are in contact with both workpieces and support the workpieces during curing of the adhesive.

BRIEF SUMMARY OF THE INVENTION

It is an object of the present invention to provide a method of joining a pin member of a first component to a second component with a cavity by means of an adhesive in order to fasten the pin in a target position extending at least partially into the cavity with a distance between the bottom surface of the cavity and the facing end of the pin, wherein the method especially comprises measures to prevent the pin from repositioning towards the bottom surface of the cavity during curing of the adhesive.

The invention discloses the technical teaching that the method of joining comprises at least the following steps:
  positioning a flexible spacer on the bottom surface of the cavity, wherein the thickness of the spacer equals or exceeds the distance between the bottom surface of the cavity and the facing end of the pin in the target position,
  filling the adhesive into the cavity onto the flexible spacer,
  positioning the pin to the target position,
  curing the adhesive and obtaining a joint between the pin and the second component.

A spacer filling is used in the space between the bottom surface of the cavity and the facing end of the pin, thus eliminating basically any adhesive from the volume below the pin. The joint between the pin and the second component is constituted by the adhesive surrounding the circumferential surface of the pin. The shrinkage of the adhesive during curing therefore can only affect the horizontal position of the pin, which is much less critical regarding the aforementioned use in a lighting device, but the spacer prevents the pin from any repositioning towards the bottom surface of the cavity.

It is an essential feature of the invention to use a spacer of dedicated flexibility, i.e. the spacer can be deformed by the pin without significant resistance during the positioning of the pin to the target position. Such deformation is preferably of elastic nature, so that the deformed spacer remains in proper contact to the pin during any pin displacement in the fine adjustment process.

In opposite to the prior art of the EP 1 690 906 B1 the present invention thus allows to execute the fine adjustment of the components to join with the spacer already in place, so that after completed adjustment to the target position the adhesive can immediately be cured.

As a preferred embodiment of the invention the first component is chosen from a light source group or from an optical component associated with a light source and the second component is chosen from a carrier, wherein during positioning the pin inside the cavity the light source is operated and a resulting lighting effect is monitored in order to locate the target position by the constitution of a target lighting effect. The invention was motivated by this application and yields a major benefit over prior art joining methods in this context.

Advantageously, the flexible spacer is formed by a slice of a polymeric foam or by a mechanical spring element or by a slice of cured adhesive. Polymeric foams can be formed from a large number of different polymers, e.g. (poly) ethylene-vinyl acetate ((P)EVA), low-density polyethylene (LDPE), nitrile rubber (NBR), polychloroprene, polyimide, polypropylene (PP), polystyrene (PS), polyurethane (PU), polyvinyl chloride (PVC), silicone, or microcellular foam.

Polymeric foams thus offer a large variety of mechanical properties and a dedicated type can be chosen based on the appropriate flexibility for the application as the spacer. Alternatively, an adhesive with suitable flexibility in the cured state, e.g. a type used for sealings, can be used to form the spacer, which is convenient in practice since the equipment to dose adhesive into the cavity is in place anyway.

Advantageously, the thickness of the flexible spacer exceeds the distance between the bottom surface of the cavity and the facing end of the pin in the target position by 5% — 50%, so that during positioning the pin to the target position the pin is pushed into the flexible spacer and the flexible spacer deforms accordingly. A significant deformation of the flexible spacer by the pin yields a robust contact between spacer and pin and an effective embracing of the end of the pin, so that the pin is less prone to horizontal displacements by shrinkage of the curing adhesive. The use of a flexible spacer of the aforementioned dimensions thus stabilizes the pin in the target position against both vertical and horizontal shifts.

Advantageously, the adhesive used for the joint between the pin and the cavity and/or the adhesive used to form the flexible spacer are chosen from an UV-light curing type. These adhesives allow for a fast and technically simple curing process compared to the use of heat-curable adhesives.

According to another preferred embodiment of the invention the first component is chosen from a light source group or from an optical component of a lighting device of a motor vehicle and the second component is chosen from a carrier of the lighting device. The optical component is for instance represented by a reflector, which is mounted on a mounting platform and adjusted to a target position relative to a fixed light source of a vehicle head light.

Furthermore, the invention concerns a joint assembly at least comprising a first component with a pin member and a second component with a cavity, wherein the pin extends at least partially into the cavity and a joint between the pin and the second component is formed by an adhesive inside the cavity, characterized in that a flexible spacer is positioned between the bottom surface of the cavity and the facing end of the pin.

Such joint assembly is advantageously established by the inventive joining method and in a preferred embodiment the pin is pushed into the flexible spacer and the flexible spacer is deformed accordingly.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
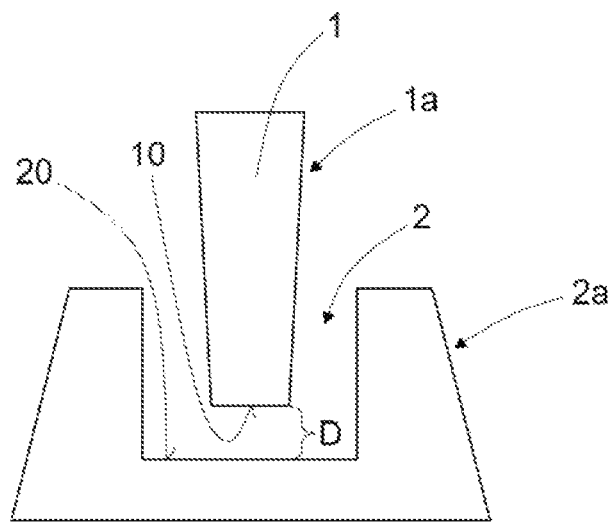
FIG. 1 illustrates the components to join in the target position.

The Figures show schematic illustrations of the four steps 100, 200, 300, 400 of the inventive method to yield an embodiment of the inventive joint assembly 500, depicted in cross-sectional representation. The pin 1 is a member of a first component 1a, for instance an optical component to be positioned most accurately relative to a light source of a lighting device of a motor vehicle, and the second component 2a exhibits a cavity 2 to receive the pin 1. In the depicted example, the pin 1 is formed by a cone with a flat end 10 and the cavity 2 exhibits a cylindrical volume, whereat matching pin cavity combinations of differing shapes can be equally appropriate for the invention on hand.

FIG. 1 shows the pin 1 in the target position extending partially into the cavity 2 with the distance D between the bottom surface 20 of the cavity 2 and the facing end 10 of the pin 1. It is the central task of the present invention to fasten the pin 1 in this target position inside the cavity 2 by means of a bonding process based on an adhesive, wherein during the curing of the adhesive the distance between the bottom surface 20 and the end 10 remains right at its target value D.

Figure 2:
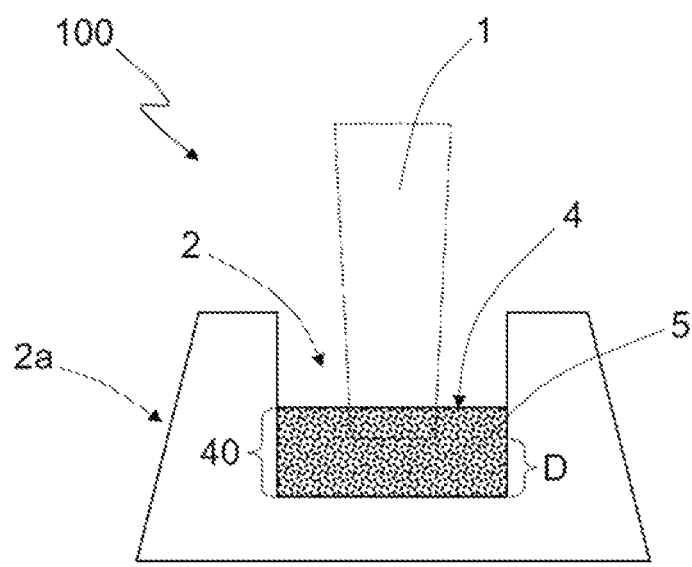
FIG. 2 illustrates the first step of the inventive method.

FIG. 2 illustrates the first step of the inventive method, namely positioning 100 the flexible spacer 4 on the bottom surface 20 of the cavity 2, wherein the thickness 40 of the spacer 4 exceeds the distance D below the pin 1 in the target position. The pin 1 is actually removed from the cavity 2 at this stage of the process and it is only indicated here by the dotted contour to illustrate the difference between spacer thickness 40 and target distance D. The thickness 40 of the spacer 4 surpasses the target distance D by about 40% in the depicted example. The spacer 4 is preferably formed by a slice of a polymeric foam 5 with tailored mechanical properties, i.e. a dedicated flexibility.

Figure 3:
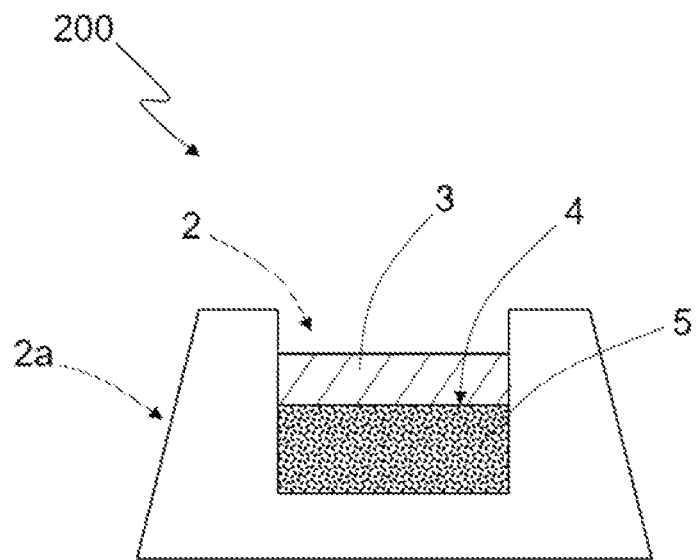
FIG. 3 illustrates the second step of the inventive method.

FIG. 3 illustrates the second step of the inventive method, namely filling 200 the adhesive 3 into the cavity 2 onto the flexible spacer 4. The pourable adhesive 3 preferably consists of an UV-light curable resin if the cavity 2 is sufficiently accessible for illumination, or alternatively a heat-curable type of adhesive is deployed. The microstructure of the polymeric foam 5 of the flexible spacer 4 preferably cannot be penetrated by the adhesive 3.

Figure 4:
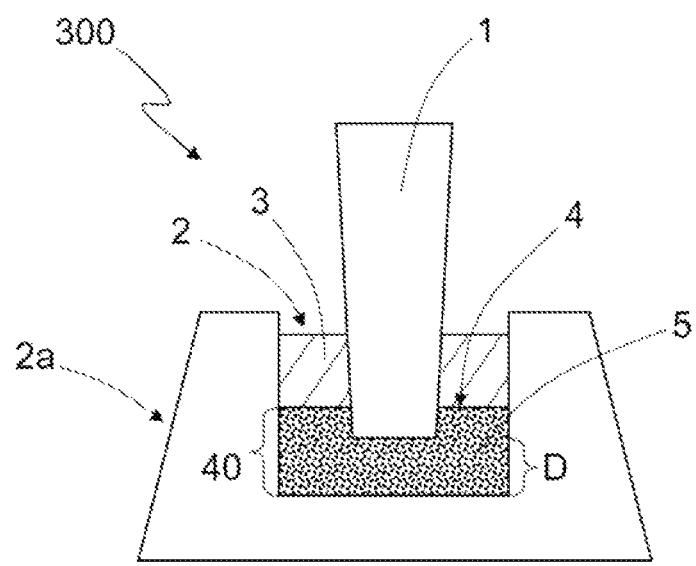
FIG. 4 illustrates the third step of the inventive method.

FIG. 4 illustrates the third step of the inventive method, namely positioning 300 the pin 1 to the target position. To this end, the bottom section of the pin 1 is dipped into the flowable adhesive 3 and pushed into the flexible spacer 4, which deforms accordingly. In the context of an application of the inventive method in the assembly process of a vehicle lighting device, wherein the pin 1 for instance is a member of a reflector to be arranged relative to a light source and the second component 2a is represented by a mounting platform, the light source is operated during positioning 300 the pin 1 and the resulting lighting effect is monitored in order to locate the target position by the constitution of a target lighting effect. The flexibility of the polymeric foam 5 of the spacer 4 must be appropriate to allow for an unhampered fine adjustment of the pin 1 to the target position. The related deformation of the flexible spacer 4 lies preferably in the elastic regime, so that a significant contact area between the pin 1 and the spacer 4 is preserved during the fine adjustment in positioning 300 the pin 1 to the target position.

Figure 5:
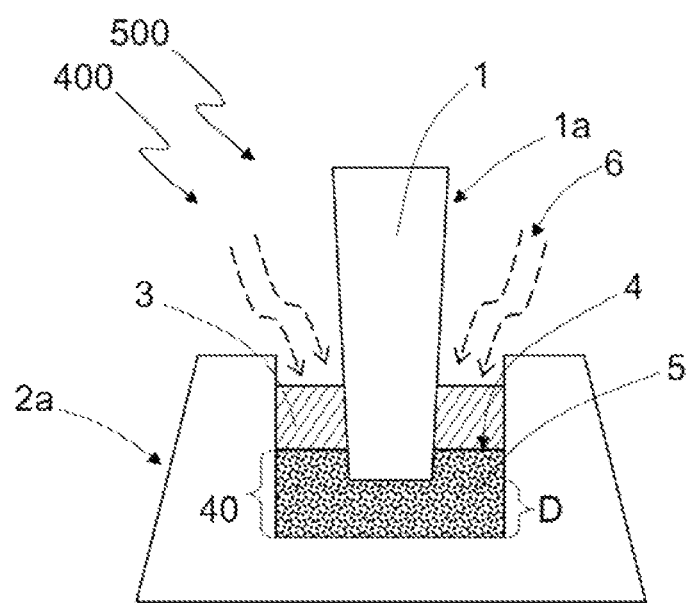
FIG. 5 illustrates the fourth step of the inventive method, and the inventive joint assembly.

FIG. 5 illustrates the inventive joint assembly 500 and the fourth step of the inventive method, namely curing 400 the adhesive 3 and obtaining a joint between the pin 1 and the second component 2a. To this end, the adhesive 3 is irradiated by UV-light 6, which typically yields a crosslinking reaction within the adhesive 3 and a related hardening effect. The adhesive joint is established between the circumferential sections of the pin 1 and the cavity 2 inside the component 2a. The volume of the cavity 2 below the pin 1 is filled by the deformed flexible spacer 4 and thus basically free of any adhesive 3. This represents the key innovation of the present invention, because in such an assembly, the shrinkage of the adhesive 3 during curing 400 does not affect the vertical position of the pin 1, so that the end of the pin 1 remains unaltered at the target distance D above the bottom surface of the cavity 2. Furthermore, the significant penetration depth of the pin 1 into the flexible spacer 4 due to the difference between the thickness 40 of the undeformed spacer 4 and the target distance D results in a rather robust fixation of the pin 1 during curing 400 also in the horizontal plane.

Therefore, the inventive method of joining enables to build a highly precise joint assembly 500 of an optical component 1a in a carrier 2a relative to the light source as parts of a vehicle lighting device.

The present invention is not limited by the embodiment described above, which is represented as an example only and can be modified in various ways within the scope of protection defined by the appending patent claims.

LIST OF NUMERALS

1 pin
10 end of pin
1a first component
2 cavity
20 bottom surface of cavity
2a second component
3 adhesive
4 spacer
40 thickness of spacer
5 polymeric foam
6 UV light
D distance
100 positioning of spacer
200 filling of adhesive
300 positioning of pin
400 curing of adhesive
500 joint assembly

We claim:

1. A method of joining a pin member of a first component to a second component using an adhesive, wherein the second component has a cavity, so as to fasten the pin in a target position extending at least partially into the cavity with a distance (D) between a bottom surface of the cavity and a facing end of the pin, the method comprising the steps of:
    positioning a flexible spacer on the bottom surface of the cavity, wherein a thickness of the flexible spacer equals or exceeds the distance (D) between the bottom surface of the cavity and the facing end of the pin in the target position,
    filling the adhesive into the cavity onto the flexible spacer,
    positioning the pin in the target position such that the flexible spacer deforms to receive the pin therein, wherein the facing end of the pin and a sidewall of the pin abut the flexible spacer when the pin is received in the flexible spacer, and
    curing the adhesive to obtain a joint between the pin and the second component.

2. The method according to claim 1, wherein the first component is chosen from a light source group or from an optical component associated with a light source, and the second component is chosen from a carrier,
    wherein during positioning of the pin inside the cavity, the light source is operated and a resulting lighting effect is monitored in order to locate the target position by constitution of a target lighting effect.

3. The method according to claim 1, wherein the flexible spacer is formed by a slice of a polymeric foam or by a mechanical spring element or by a slice of cured adhesive.

4. The method according to claim 1, wherein the thickness of the flexible spacer exceeds the distance (D) between the bottom surface of the cavity and the facing end of the pin in the target position by 5%-50%.

5. The method according to claim 3, wherein the adhesive used for the joint between the pin and the cavity and/or the adhesive used to form the flexible spacer are chosen from an ultraviolet-light curing type.

6. The method according to claim 1, wherein the first component is chosen from a light source group or from an optical component of a lighting device of a motor vehicle, and the second component is chosen from a carrier of the lighting device.

* * * * *